United States Patent
Lim

(10) Patent No.: US 10,091,485 B2
(45) Date of Patent: Oct. 2, 2018

(54) METHOD FOR ENCODING AND RECONSTRUCTING DEPTH IMAGE USING COLOR IMAGE INFORMATION

(71) Applicant: ELECTRONICS AND TELECOMMUNICATIONS RESEARCH INSTITUTE, Daejeon (KR)

(72) Inventor: Han Shin Lim, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 285 days.

(21) Appl. No.: 14/926,256

(22) Filed: Oct. 29, 2015

(65) Prior Publication Data
US 2016/0366391 A1    Dec. 15, 2016

(30) Foreign Application Priority Data

Jun. 15, 2015 (KR) ........................ 10-2015-0084214

(51) Int. Cl.
| | |
|---|---|
| H04N 13/00 | (2018.01) |
| G01B 11/22 | (2006.01) |
| H04N 13/161 | (2018.01) |
| H04N 19/597 | (2014.01) |
| H04N 13/15 | (2018.01) |

(52) U.S. Cl.
CPC ........... *H04N 13/161* (2018.05); *G01B 11/22* (2013.01); *H04N 13/15* (2018.05); *H04N 19/597* (2014.11); *H04N 2013/0077* (2013.01)

(58) Field of Classification Search
CPC ............... G01B 11/22; H04N 13/0048; H04N 2013/0077; H04N 2013/0092
USPC .......................................................... 348/43
See application file for complete search history.

(56) References Cited

U.S. PATENT DOCUMENTS

| | | | |
|---|---|---|---|
| 8,098,276 B2 | 1/2012 | Chang et al. | |
| 2009/0103616 A1 | 4/2009 | Ho et al. | |
| 2013/0002816 A1* | 1/2013 | Hannuksela | G06T 9/00 348/43 |
| 2014/0192154 A1 | 7/2014 | Jeong et al. | |
| 2014/0211286 A1 | 7/2014 | Nam et al. | |
| 2015/0093024 A1* | 4/2015 | Pajak | G06T 9/00 382/166 |

(Continued)

FOREIGN PATENT DOCUMENTS

| | | |
|---|---|---|
| KR | 10-0918862 B1 | 9/2009 |
| KR | 10-2013-0018629 A | 2/2013 |

OTHER PUBLICATIONS

Hanshin Lim et al., "Depth Map Rasterization Using Triangulation and Color Consistency For Various Sampling Structures", 2013 IEEE Trans on Circuits and Systems for Video Technology.

(Continued)

*Primary Examiner* — Francis G Geroleo
(74) *Attorney, Agent, or Firm* — LRK Patent Law Firm

(57) ABSTRACT

A method of encoding and reconstructing a depth image using color image information includes segmenting a color image and a depth image corresponding to the color image into block units, selecting a position of a pixel sampling value from each block of the depth image using the color image information, and encoding the pixel sampling value of the selected position as depth information.

8 Claims, 7 Drawing Sheets

(56) References Cited

U.S. PATENT DOCUMENTS

2015/0326880 A1* 11/2015 He ................. H04N 19/597
                                              375/240.13

OTHER PUBLICATIONS

Han-Shin Lim et al., "A novel 2D to 3D conversion method using 3D affine geometry and color consistency", Workshop on Image Processing and Image Understanding (IPIU2014), Feb. 12, 2014.

* cited by examiner

METHOD FOR ENCODING AND RECONSTRUCTING DEPTH IMAGE USING COLOR IMAGE INFORMATION

CROSS-REFERENCE TO RELATED APPLICATION

This application claims priority to and the benefit of Korean Patent Application No. 2015-0084214, filed on Jun. 15, 2015, the disclosure of which is incorporated herein by reference in its entirety.

BACKGROUND

1. Field of the Invention

The present invention relates to a method for encoding a depth image using color image information and a method for reconstructing the depth image using the color image information, and more particularly, to a method for selecting a sampling value from the depth image and encoding the sampling value using the color image information and mesh-based method for reconstructing a depth image using the color image information.

2. Discussion of Related Art

Recently, depth image-based rendering (DIBR) has been spotlighted as a method of representing a 3-dimensional video. DIBR is a method for creating scenes at different viewpoints using reference images having information such as a depth, a difference angle, etc. for each pixel related. Such DIBR not only easily performs rendering on shapes which are difficult and complex to represent using a 3-dimensional model, but also enables an application of a signal processing method such as general image filtering. In addition, such DIBR has an advantage of enabling production of a high-quality 3-dimensional video.

Such DIBR uses a depth image (a depth map) and a texture image (a color image) obtained through a depth camera and a multi-view camera to realize the foregoing. Particularly, the depth image is used for representing the 3-dimensional model more realistically (that is, is used for producing the 3-dimensional video having a greater 3-dimensional effect).

A depth image may be defined as an image which represents a distance between an object located in a 3-dimensional space and a camera photographing the object in black-and-white units. Such a depth image is often used in 3-dimensional restoration techniques or 3-dimensional warping techniques through depth information and camera parameters.

In addition, depth images are applied in various fields such as free viewpoint television and 3-dimensional television. Free viewpoint television is television which allows a user to watch an image at a convenient viewpoint according to the user's selection, rather than watching the image at only one viewpoint which is previously set. This feature of free viewpoint television allows creation of images at random viewpoints in consideration of multiview images photographed by several cameras and multiview depth images corresponding to the multiview images. Meanwhile, 3-dimensional television has a feature of implementing a realistic image by adding a depth image to an existing 2-dimensional television, and active research and development of 3-dimensional television has been performed recently.

Also, an existing method of encoding and reconstructing a mesh-based depth image includes selecting a part in which a high-frequency component is large within color information or a depth image as a position of a standard value. However, since encoding techniques mainly include eliminating or decreasing high-frequency components, encoding and reconstructing of such sampling values tend not to be efficient.

To solve the foregoing problems of the related art, the present invention provides a method for segmenting the depth image into block units and selecting and encoding a sampling value in each block using the color image information, and a method for reconstructing the mesh-based depth image using the color image information.

An object of the present invention is not limited to the foregoing object and the above and other objects, features and advantages of the present invention may become more apparent to those of ordinary skill in the art from the following detailed description.

SUMMARY OF THE INVENTION

According to an aspect of the present invention, there is provided a method for encoding a depth image using color image information, the method including: segmenting a color image and a depth image corresponding to the color image into block units; selecting a position of a pixel sampling value in each block of the depth image using the color image information; and encoding the pixel sampling value of the selected position as depth information.

The segmenting of the color image and the depth image corresponding to the color image into block units may include segmenting the color image and the depth image into block units having a height of n pixels and a width of n pixels, where n is a multiple of 2.

The selecting of the position of the pixel sampling value from each block of the depth image using the color image information may include converting colors of blocks of the color image corresponding to the blocks of the depth image to frequencies and selecting a position of a pixel having a pixel value for which absolute values of differences and DC coefficients of the blocks of the frequency-converted color image are the minimum for the position of the pixel sampling value of each block.

The encoding of the pixel sampling value of the selected position as depth information may include downsampling the depth image into units having a height of n pixels and a width of n pixels and encoding the pixel sampling value of the downsampled depth image to the depth information.

According to another aspect of the present invention, there is provided a method for reconstructing a depth image using color image information, the method including: in a method for reconstructing the depth image using the depth information encoded through the above-mentioned encoding method, decoding the encoded depth image and reconstructing a pixel sampling value for each block as depth information; selecting a position of the reconstructed pixel sampling value in each block of the depth image using the color image information; and reconstructing the depth image using the position of the reconstructed pixel sampling value for each block.

The selecting of the position of the reconstructed pixel sampling value from each block of the depth image using the color image information may include converting colors of blocks of the color image corresponding to the blocks of the depth image to frequencies, and selecting a position of a pixel having a pixel value for which absolute values of differences and DC coefficients of the blocks of the frequency-converted color image are the minimum for the position of a reconstructed pixel sampling value of each block.

The reconstructing of the depth image using the position of the reconstructed pixel sampling value for each block may include generating a mesh in the depth image using the position of the reconstructed pixel sampling value as a node and determining a depth value of the inside of the mesh in each block using the color image information.

According to still another aspect of the present invention, there is provided a device for encoding a depth image using color image information, including: a block dividing unit for segmenting a color image and the depth image corresponding to the color image into block units; a pixel sampling position selecting unit for selecting a position of a pixel sampling value in each block of the depth image using the color image information; and an encoding unit for encoding the pixel sampling value of the selected position to depth information.

The block dividing unit may segment the color image and the depth image into block units having a height of n pixels and a width of n pixels, where n is a multiple of 2.

The pixel sampling position selecting unit may convert colors of blocks of the color image corresponding to the blocks of the depth image to frequencies and select a position of a pixel having a pixel value for which absolute values of differences and DC coefficients of the blocks of the frequency-converted color image are the minimum for a position of a pixel sampling value of each block.

The encoding unit may downsample the depth image into units having a height of n pixels and a width of n pixels and encode the pixel sampling value of the downsampled depth image as the depth information.

According to yet another aspect of the present invention, there is provided a device for reconstructing a depth image using color image information, the device including: a decoding unit for decoding a depth image encoded by the above-mentioned encoding device and reconstructing a pixel sampling value for each block as depth information; a pixel sampling position selecting unit for selecting a position of the reconstructed pixel sampling value in each block of the depth image using the color image information; and a depth image reconstructing unit for reconstructing the depth image using the position of the reconstructed pixel sampling value for each block.

The pixel sampling position selecting unit may convert frequencies of blocks of the color image corresponding to the blocks of the depth image and select a position of a pixel having a pixel value for which absolute values of differences and DC coefficients of the blocks of the frequency-converted color image are the minimum for the position of the reconstructed pixel sampling value of each block.

The depth image reconstructing unit may generate a mesh in the depth image using the position of the reconstructed pixel sampling value as a node and determine a depth value of the inside of the mesh in each block using the color image information.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
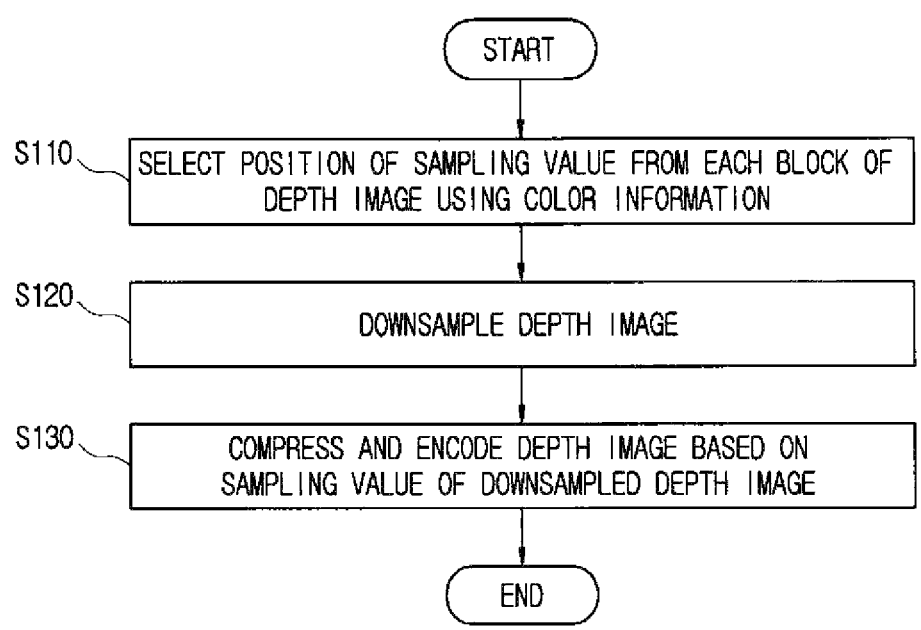
FIG. 1 is a flowchart illustrating a method of encoding a depth image using color image information according to an embodiment of the present invention.

Advantages and features of the present invention and methods for achieving them will be apparent from the accompanying drawings and the more particular description of preferred embodiments of the present invention. However, the present invention may be embodied in different forms and should not be construed as limited to the embodiments set forth herein. The preferred embodiments are merely provided for a complete disclosure of the present invention to fully convey the scope of the invention to those skilled in the art. The present invention is defined by the claims. Meanwhile, the terminology used herein is only intended to describe specific embodiments of the present invention and is not intended to limit the scope of the invention. In the specification, the singular forms "a," "an," and "the" are intended to include the plural forms as well, unless the context clearly indicates otherwise. Also, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail below with reference to the accompanying drawings. In adding reference numerals to elements of each drawing, like reference numerals refer to like elements throughout the drawings. In the descriptions of the present invention, well-known structures that are not related to the scope of the present invention will be omitted.

FIG. 1 is a flowchart illustrating a method of encoding a depth image using color image information according to an embodiment of the present invention.

First, a color image and the depth image corresponding to the color image are segmented into block units, and a position of a pixel sampling value is selected from each block of the depth image using the color image information (S110).

Figure 2:
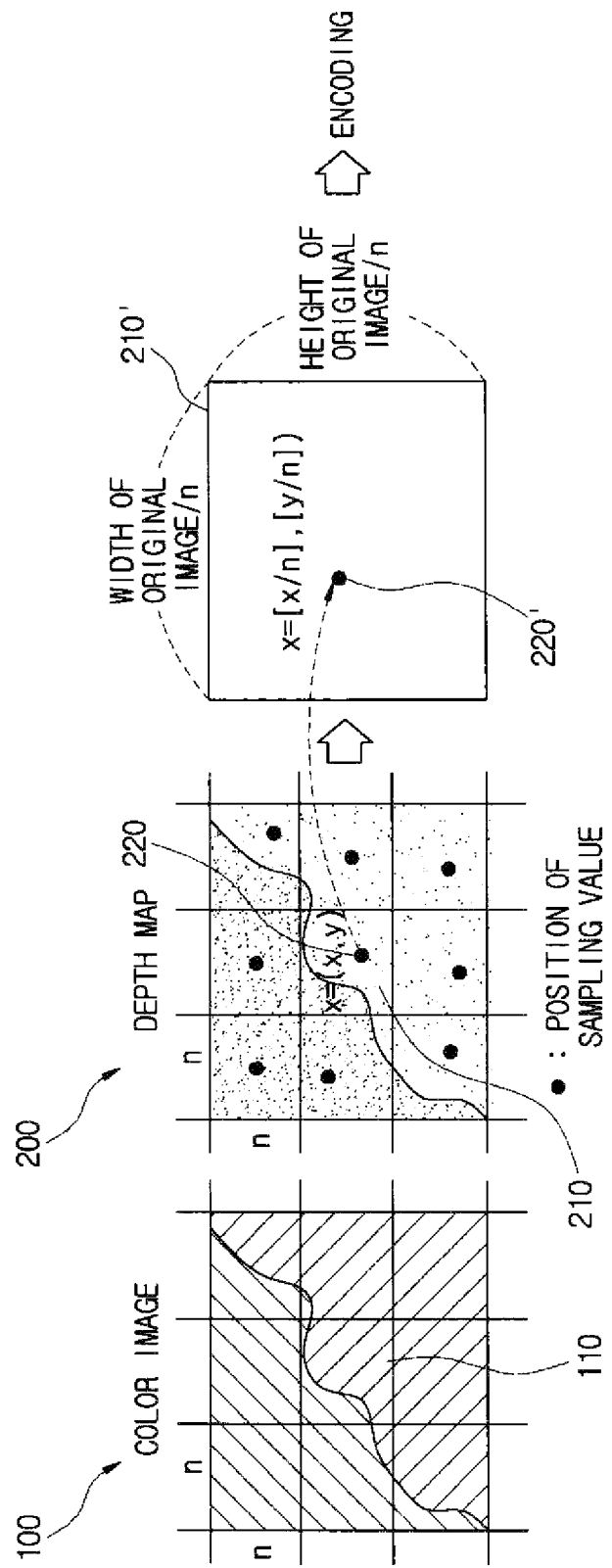
FIG. 2 is a conceptual diagram illustrating a procedure of selecting a position of a pixel sampling value from the depth image using the color image information according to an embodiment of the present invention.

FIG. 2 illustrates, as an example, a procedure of selecting a position of a pixel sampling value from a depth image using color image information according to an embodiment of the present invention.

Referring to FIG. 2, a color image 100 and a depth image 200 are segmented into block units 110 and 210 each having a height of n pixels and a width of n pixels. Here, it is preferable that n be a multiple of 2, but embodiments of the present invention are not limited to this.

A position X=(x,y) 220 of the pixel sampling value of blocks 210 of the depth image 200 is determined based on color image information of blocks 110 of the color image 100 corresponding to the blocks of the depth image 200. For example, colors of the blocks 110 of the color image 100 corresponding to the blocks 210 of the depth image 200 is converted to frequencies, and a position of a pixel having, a pixel value for which absolute values of differences and DC coefficients of the blocks of the frequency-converted color image are the minimum is selected for a position 220 of the pixel sampling value of each block.

Subsequently, the depth image 200 is downsampled in units having a height of n pixels and a width of n pixels (S120), and the position 220 of the pixel sampling value selected in FIG. 2 is converted into X=([x/n], [y/n]) 220' in the downsampled depth image 210'. Here, [a] denotes a maximum integer value not exceeding a.

Then, the downsampled depth image 210' is encoded using a pixel sampling value corresponding to the position 220' of the pixel sampling value as depth information (S130).

A 3-dimensional advanced video encoding (3D-AVC) technique, a 3-dimensional high efficiency video encoding (3D-HEVC) technique, etc. may be used for encoding the depth image. Hereinafter, respective encoding techniques available for encoding the depth image will be described in brief. The encoding techniques to be described below are only examples and various types of the encoding techniques of depth images may be used.

3D-AVC

3D-AVC uses a downsampled depth image when encoding a depth image. Since an importance of an accurate encoding of the depth image which is relatively simple compared to a color image is low, encoding is performed in a low resolution to decrease a bit ratio.

Depth-based motion vector prediction (DMVP), adaptive luminance compensation (ALC), etc. may be used for encoding the color image in 3D-AVC. DMVP predicts motions in the color image using motion information of the depth image which is first encoded at the same viewpoint. ALC is used for decreasing a color information error generated due to a viewpoint difference.

In-loop joint inter-view depth filtering (JVDF), motion prediction from texture to depth, etc. may be used for encoding the depth image. JVDF compensates for irregularities of depth information existing between viewpoints. The motion prediction from texture to depth is used for predicting motions in the depth image using information of the color image first encoded at a reference viewpoint.

3D-HEVC

A depth modeling mode (DMM), depth quadtree prediction, etc. are used for encoding a depth image of 3D-HEVC. The DMM is added to an existing intra prediction mode to encode precise boundaries between areas of the depth image. The depth quadtree prediction limits a quadtree of the depth image compared to a quadtree of the color image in consideration of the fact that the depth image is simpler than the color image.

Figure 3:
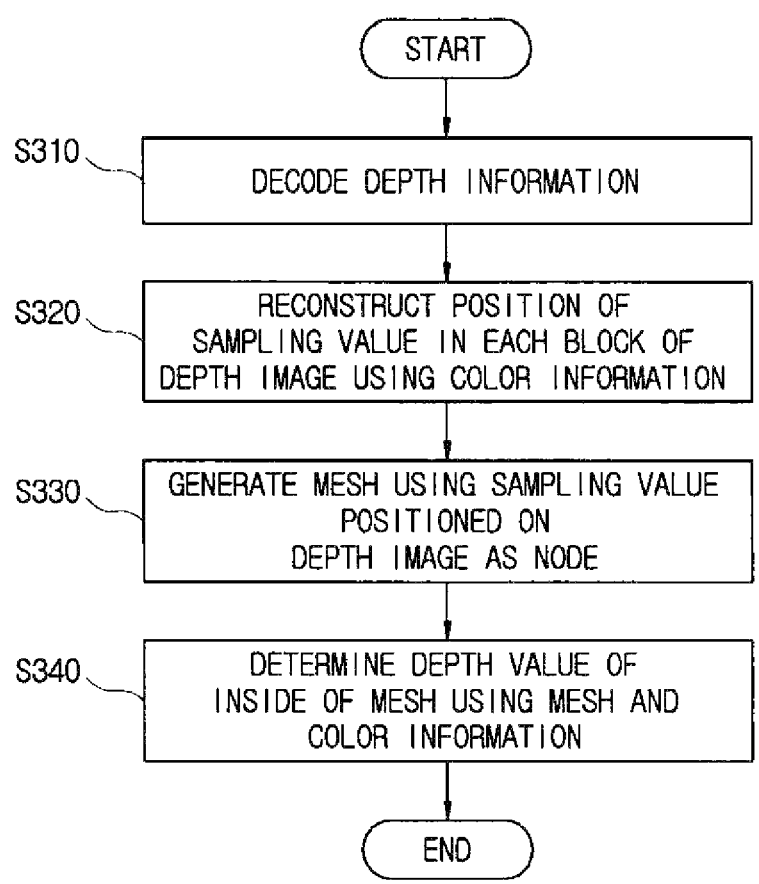
FIG. 3 is a flowchart illustrating a method of reconstructing the depth image using the color image information according to an embodiment of the present invention.

FIG. 3 is a flowchart illustrating a method of reconstructing the depth image using color image information according to an embodiment of the present invention.

First, the depth image which is encoded by the encoding method of FIGS. 1 and 2 is decoded to reconstruct a pixel sampling value for each block of the depth image as depth information (S310).

Subsequently, a position of the pixel sampling value is reconstructed in each block of the depth image using the color image information (S320).

Then, the depth image is reconstructed using the reconstructed position of the pixel sampling value for each block of the depth image.

Figure 4:
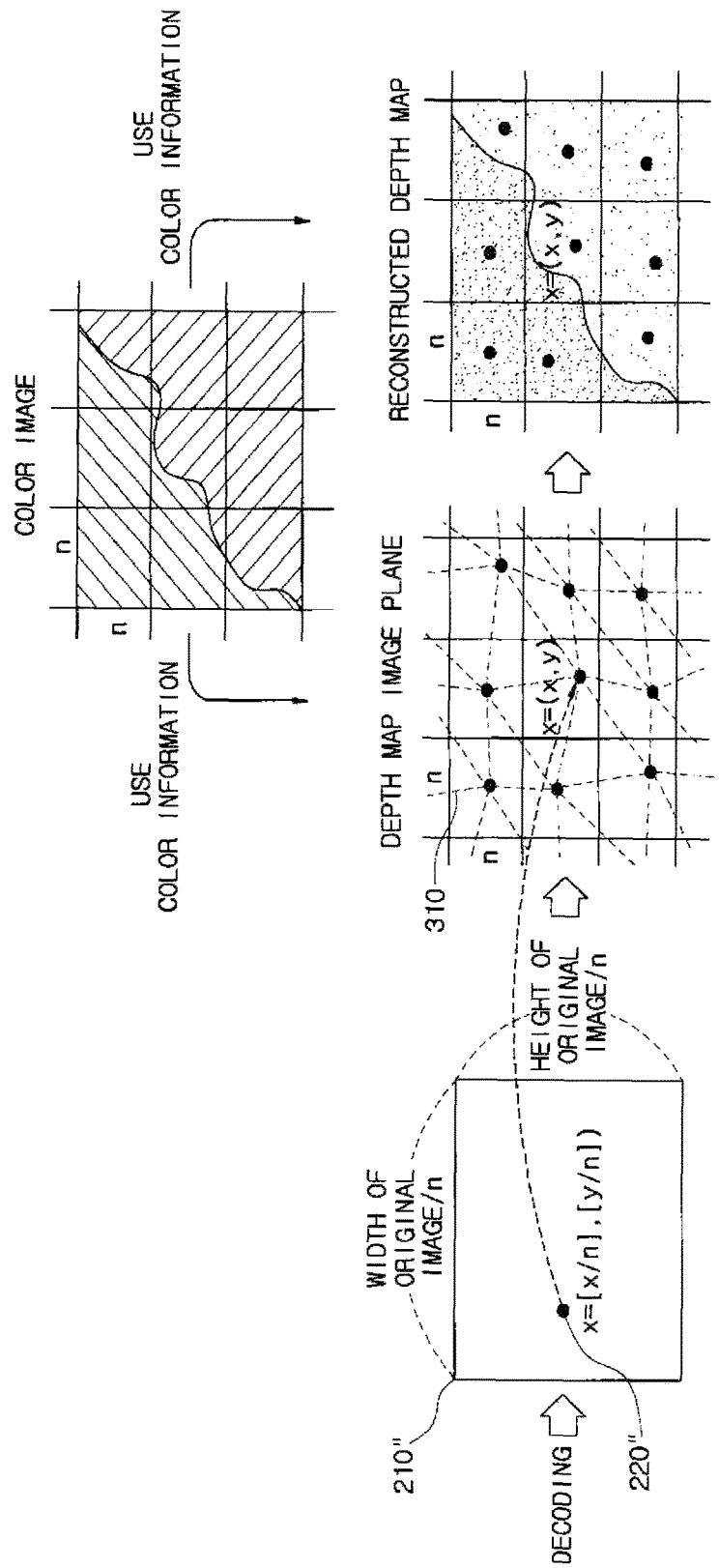
FIG. 4 is a conceptual diagram of a procedure for reconstructing a mesh based depth image using the color image information according to an embodiment of the present invention.

FIG. 4 illustrates, as an example, a procedure for reconstructing a mesh-based depth image using color image information according to an embodiment of the present invention.

Referring to FIG. 4, a position 220" of a pixel sampling value in a downsampled depth image 210" which is reconstructed through the decoding procedure is determined based on the color image information of blocks of the color image in the depth image to be reconstructed. For example, colors of the blocks of the color image corresponding to the blocks of the depth image to be reconstructed is converted to frequencies, and a position of a pixel having a pixel value for which absolute values of differences and DC coefficients of the blocks of the frequency-converted color image are the minimum is selected for the position of the pixel sampling value of each block.

Accordingly, the position of the pixel sampling value for each block of the depth image to be reconstructed is determined, and a mesh 310 is generated using the position of the pixel sampling value for each block as a node (S330).

Then, a depth value of the inside of the mesh 310 is determined using the generated mesh 310 and the color image information (S340).

For example, assignment of the depth value of the inside of the mesh using the color image information is performed by assigning the most suitable depth value in terms of color consistency to each pixel of the inside of the mesh. Hereinafter, a procedure of the assignment of the depth value in accordance with the embodiment of the present invention will be described in brief. The assignment method of the depth value to be described below is only one example and various types of the assignment techniques of the depth value may be used in the embodiments of the present invention.

First step—After generating the mesh, it is checked whether there is a section in which a depth between respective edges of the mesh is inconsistent.

Second step—Around each node, representative color blocks of each node are selected according to whether there is a section in which the depth is inconsistent.

Third step—Similarities between a block centered on each pixel of the inside of the mesh and the representative color blocks of the nodes selected in the second step are compared, and the most similar representative color block is selected.

Fourth step—a depth value ($d_{x,y}$) of each pixel (x,y) is calculated from a depth value of a node $a_k$ having the most similar representative color block using the following equation 1.

$$d_{x,y} = p_k x + q_k y + r_k \quad \text{[Equation 1]}$$

Here, ($p_k$, $q_k$, $r_k$) are plane coefficients obtained by fitting the depth values of the node $a_k$ and the nodes around the node $a_k$.

According to the present invention, since the position of the pixel for which the difference between the sampling value selected using the color image information and a DC coefficient of the color image is the minimum is selected, an advantage that color consistency of the color image and depth consistency of the depth image are quite high may be used.

Therefore, in the procedures of encoding and reconstructing the depth, image, the present invention has lower loss and is stronger against noise than existing encoding and reconstructing where sample points tend to be selected on features having strong high frequencies.

Furthermore, since a method for generating a mesh-based depth map using the color image information is more accurate than an existing method in representing the section in which the depth is inconsistent, reconstructing of the section in which the depth is inconsistent may be performed more accurately.

Hereinafter, encoding and reconstructing devices of the depth image using the color image information according to an embodiment of the present invention will be described referring to FIGS. 5 and 6.

Figure 5:
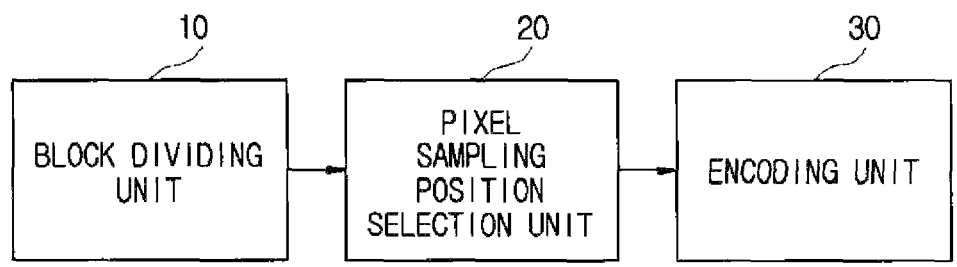
FIG. 5 is a block diagram illustrating an encoding device of the depth image using the color image information according to an embodiment of the present invention.

FIG. 5 is a block diagram illustrating an encoding device of a depth image using color image information according to an embodiment of the present invention.

Referring to FIG. 5, the encoding device of the depth image using the color image information according to the embodiment of the present invention includes a block dividing unit 10, a pixel sampling position selection unit 20, and an encoding unit 30.

The block dividing unit 10 segments a color image and a depth image corresponding to the color image into block units.

For example, the block dividing unit 10 segments the color image and the depth image into block units having a height of n pixels and a width of n pixels. Here, it is preferable that n be a multiple of 2, but embodiments of the present invention are not limited to this.

The pixel sampling position selection unit 20 selects a position of a pixel sampling value from each block of the depth image using the color image information.

The pixel sampling position selection unit 20 determines a position X=(x,y) of the pixel sampling value of each block of the depth image based on the color image information of blocks of the color image corresponding to the blocks of the depth image.

For example, colors of the blocks of the color image corresponding to the blocks of the depth image is converted to frequencies, and a position of a pixel having a pixel value for which absolute values of differences and DC coefficients of the blocks of the frequency-converted color image are the minimum is selected for the position of the pixel sampling value of each block.

The encoding unit 30 encodes the pixel sampling value of the selected position as depth information.

3D-AVC, 3D-HEVC, etc. may be used for encoding the depth image. The encoding techniques described above are only examples and various types of the encoding techniques of depth images may be used in embodiments of the present invention.

Figure 6:
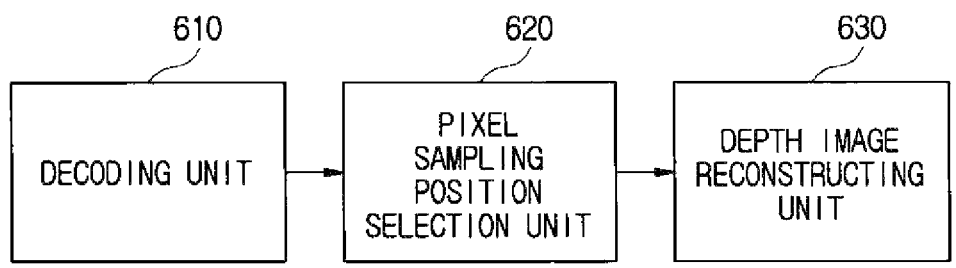
FIG. 6 is a block diagram illustrating a reconstructing device of the depth image using the color image information according to an embodiment of the present invention.

FIG. 6 is a block diagram illustrating a reconstructing device of the depth image using the color image information according to an embodiment of the present invention.

Referring to FIG. 6, the reconstructing device of the depth image using the color image information according to an embodiment of the present invention includes a decoding unit 610, a pixel sampling position selection unit 620, and a depth image reconstructing unit 630.

The decoding unit 610 decodes the depth image encoded by the encoding device of FIG. 5 and reconstructs the pixel sampling value for each block as the depth information.

The pixel sampling position selection unit 620 selects a position of the reconstructed pixel sampling value from each block of the depth image using the color image information.

The pixel sampling position selection unit 620 determines a position of the pixel sampling value in the downsampled depth image which is reconstructed through the decoding procedure by the decoding unit 610 based on the color image information of blocks of the color image in a depth image to be reconstructed.

For example, colors of the blocks of the color image corresponding to the blocks of the depth image to be reconstructed is converted to frequencies, and a position of a pixel having a pixel value for which absolute values of differences and DC coefficients of the blocks of the frequency-converted color image are the minimum is selected for a position of a pixel sampling value of each block.

The depth image reconstructing unit 630 reconstructs the depth image using the position of the pixel sampling value for each block reconstructed in the pixel sampling position selection unit 620.

For example, the depth image reconstructing unit 630 generates a mesh using the position of the pixel sampling value for each block as a node when the position of the pixel sampling value for each block of the depth image to be reconstructed is determined.

Then, the depth image reconstructing unit 630 determines a depth value of the inside of the mesh using the generated mesh and the color image information.

For example, the depth image reconstructing unit 630 assigns the most suitable depth value in terms of color consistency to each pixel of the inside of each mesh based on the color image information.

According to the present invention as described above, since the position of the pixel for which a difference, between the sampling value selected using the color image information and the DC coefficient of the color image is the minimum is selected, there is an advantage in that color consistency of the color image and depth consistency of the depth image are quite high.

Therefore, in the procedure of encoding and reconstructing the depth image, the present invention has lower loss and is stronger against noise than existing encoding and reconstructing where sample points tend to be selected on features having strong high frequencies.

Furthermore, since a method for generating a mesh-based depth map using the color image information is more accurate than an existing method in representing the section in which the depth is inconsistent, reconstructing of the section in which the depth is inconsistent may be performed more accurately.

Figure 7:
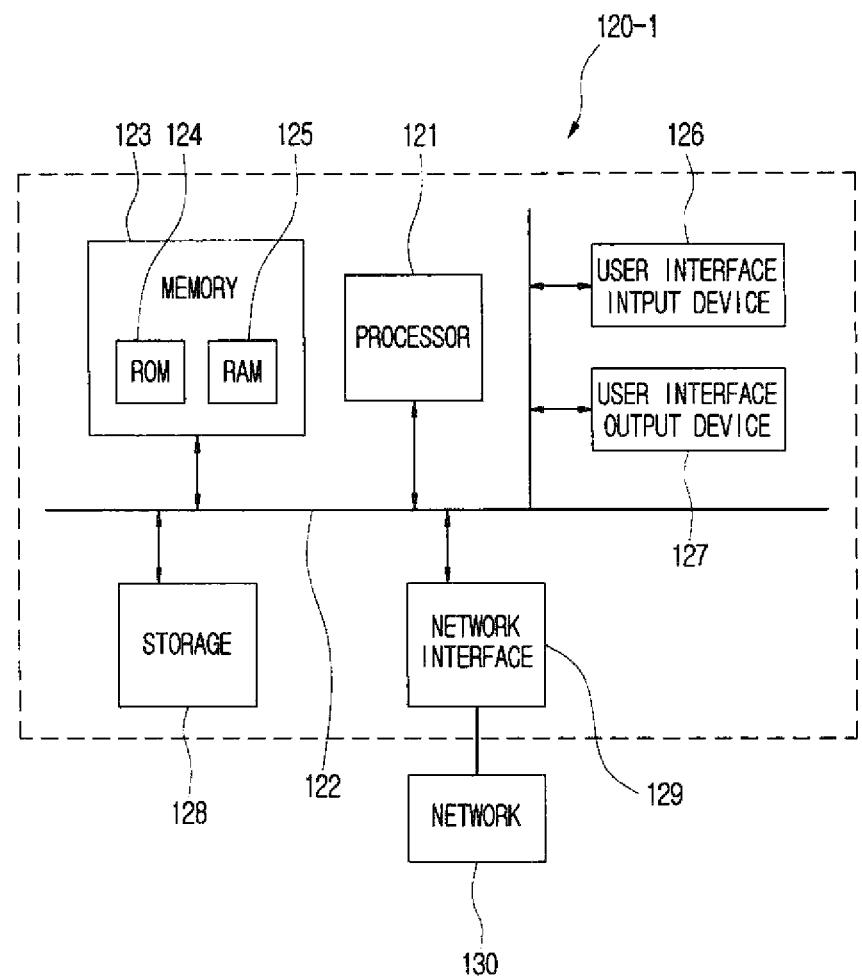
FIG. 7 is a view illustrating an example of a computer system in which a method for encoding and reconstructing depth image using color image information according to an embodiment of the present invention is performed.

The method for encoding and reconstructing depth image using color image information according to an embodiment of the present invention may be implemented in a computer system or may be recorded in a recording medium. As illustrated in FIG. 7, a computer system may include at least one processor 121, a memory 123, a user interface input device 126, a data communication bus 122, a user interface output device 127, and a storage 128. The components perform data communication via the data communication bus 122.

The computer system may further include a network interface 129 coupled to a network. The processor 121 may be a central processing unit (CPU) or a semiconductor device processing a command stored in the memory 123 and/or the storage 128.

The memory 123 and the storage 128 may include various types of volatile or nonvolatile storage mediums. For example, the memory 123 may include a ROM 124 and a RAM 125.

Thus, the method for encoding and reconstructing depth image using color image information according to an embodiment of the present invention may be implemented as a computer-executable method. When the method for encoding and reconstructing depth image using color image information according to an embodiment of the present invention is performed in a computer device, computer-readable commands may perform the method according to the present invention.

The method for encoding and reconstructing depth image using color image information according to an embodiment of the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

It will be apparent to those skilled in the art that various modifications can be made to the above-described exemplary embodiments of the present invention without departing from the spirit or scope of the invention. Thus, the preferred embodiments described above are exemplary in all aspects in different forms and should not be construed as limited to the embodiments set forth herein. The essential technical scope of the present invention is disclosed in the appended claims, and it is intended that the present invention cover all such modifications provided within the scope of the claims and their equivalents.

What is claimed is:

1. A computer-implemented method for encoding a depth image using color image information, the method comprising:
    segmenting a color image and a depth image corresponding to the color image into block units;
    selecting a position of a pixel sampling value from each block of the depth image using the color image information; and
    encoding the pixel sampling value of the selected position as depth information, wherein
    the encoding the pixel sampling value further comprises,
    downsampling the depth image into units having a height of n pixels and a width of n pixels and encoding the pixel sampling value of the downsampled depth image as the depth information, wherein
    the selecting of the position of the pixel sampling value from each block of the depth image using the color image information comprises converting colors of blocks of the color image corresponding to blocks of the depth image to frequencies, and
    selecting a position of a pixel having a pixel value for a position of a pixel sampling value of each block, the pixel sampling value being determined based on absolute values of differences of the blocks and DC coefficients of the blocks of the frequency-converted color image are the minimum.

2. The method of claim 1, wherein the segmenting of the color image and the depth image corresponding to the color image into block units comprises segmenting the color image and the depth image into block units having a height of n pixels and a width of n pixels, where n is a multiple of 2.

3. A computer-implemented method for reconstructing a depth image using color image information, the method comprising:
    segmenting a color image and a depth image corresponding to the color image into block units;
    selecting a position of a pixel sampling value from each block of the depth image using the color image information;
    encoding the pixel sampling value of the selected position as depth information, wherein
    the encoding the pixel sampling value further comprises,
    downsampling the depth image into units having a height of n pixels and a width of n pixels and encoding the pixel sampling value of the downsampled depth image as the depth information;
    decoding the encoded pixel sampling value of the selected position as depth information and reconstructing a pixel sampling value for each block as the depth information;
    selecting a position of the reconstructed pixel sampling value from each block of the depth image using the color image information; and
    reconstructing the depth image using the position of the reconstructed pixel sampling value for each block, wherein
    the selecting of the position of the reconstructed pixel sampling value from each block of the depth image using the color image information comprises converting colors of blocks of the color image corresponding to blocks of the depth image to frequencies, and
    selecting a position of a pixel having a pixel value for a position of a reconstructed pixel sampling value of each block, the pixel sampling value being determined based on absolute values of differences of the frequency-converted blocks and DC coefficients of the frequency-converted blocks of the color image are the minimum.

4. The method of claim 3, wherein the reconstructing of the depth image using the position of the reconstructed pixel sampling value for each block comprises generating a mesh in the depth image using the position of the reconstructed pixel sampling value as a node and determining a depth value of the inside of the mesh using the color image information.

5. A device for encoding a depth image using color image information, the device comprising:
    one or more computer-executable units being configured and executed by a processor using algorithms associated with at least one non-transitory storage device, the algorithms, when executed, causing the processor to execute one or more computer-executable units, the computer-executable units comprising,
    a block dividing unit configured to segment a color image and the depth image corresponding to the color image into block units;
    a pixel sampling position selecting unit configured to select a position of a pixel sampling value from each block of the depth image using the color image information; and
    an encoding unit configured to encode the pixel sampling value of the selected position as depth information, wherein the encoding unit is further configured to
    downsample the depth image into units having a height of n pixels and a width of n pixels and encode the pixel sampling value of the downsampled depth image as the depth information,
    wherein the pixel sampling position selecting unit converts frequencies of blocks of the color image corresponding to blocks of the depth image and selects a position of a pixel having a pixel value for a position of the reconstructed pixel sampling value of each block, the reconstructed pixel sampling value being determined based on absolute values of differences of the frequency-converted blocks and DC coefficients of the frequency-converted blocks of the color image are the minimum.

6. The device of claim 5, wherein the block dividing unit segments the color image and the depth image into block units having a height of n pixels and a width of n pixels, where n is a multiple of 2.

7. A device for reconstructing a depth image using color image information, the device comprising:
one or more computer-executable units being configured and executed by a processor using algorithms associated with at least one non-transitory storage device, the algorithms, when executed, causing the processor to execute one or more computer-executable units, the computer-executable units comprising,
a block dividing unit configured to segment a color image and the depth image corresponding to the color image into block units;
a pixel sampling position selecting unit configured to select a position of a pixel sampling value from each block of the depth image using the color image information;
an encoding unit configured to encode the pixel sampling value of the selected position as depth information, wherein the encoding unit is further configured to downsample the depth image into units having a height of n pixels and a width of n pixels and encode the pixel sampling value of the downsampled depth image as the depth information;
a decoding unit configured to reconstruct a pixel sampling value for each block as depth information;
a pixel sampling position selecting unit configured to select a position of the reconstructed pixel sampling value from each block of the depth image using the color image information; and
a depth image reconstructing unit configured to reconstruct the depth image using, the position of the reconstructed pixel sampling value for each block, wherein
the pixel sampling position selecting unit is further configured to convert frequencies of blocks of the color image corresponding to blocks of the depth image and to select a position of a pixel having a pixel value for a position of the reconstructed pixel sampling value of each block, the reconstructed pixel sampling value being determined based on absolute values of differences of the frequency-converted blocks and DC coefficients of the frequency-converted blocks of the color image are the minimum.

8. The device of claim 7, wherein the depth image reconstructing unit is further configured to generate a mesh in the depth image using the position of the reconstructed pixel sampling value as a node and to determine a depth value of the inside of the mesh using the color image information.

* * * * *